United States Patent [19]
Brown

[11] Patent Number: 4,781,343
[45] Date of Patent: Nov. 1, 1988

[54] LOAD DISTRIBUTING CURVED TAPES ON PARAFOIL PANELS

[75] Inventor: Glen J. Brown, Santa Cruz, Calif.
[73] Assignee: Vertigo, Inc., Lake Elsinore, Calif.
[21] Appl. No.: 107,790
[22] Filed: Oct. 13, 1987
[51] Int. Cl.$^4$ .............................................. B64D 17/02
[52] U.S. Cl. .................................................... 244/145
[58] Field of Search ....................... 244/142, 145, 127

[56] References Cited

U.S. PATENT DOCUMENTS

| Re. 26,427 | 7/1968 | Jalbert . | |
|---|---|---|---|
| 2,365,184 | 12/1944 | Frieder et al. . | |
| 2,465,409 | 3/1949 | Weinig . | |
| 2,494,600 | 1/1950 | Weinig . | |
| 2,505,954 | 5/1950 | Frieder et al. | 244/145 |
| 2,959,385 | 11/1960 | Buhler | 244/145 |
| 3,199,814 | 8/1965 | Frieder . | |
| 3,227,403 | 1/1966 | Ferguson . | |
| 3,228,635 | 1/1966 | Hughes et al. . | |
| 3,298,635 | 1/1967 | Barish . | |
| 3,331,573 | 7/1967 | Winker et al. . | |
| 3,412,963 | 11/1968 | Struble, Jr. . | |
| 3,428,277 | 2/1969 | Everett, Jr. . | |
| 3,524,613 | 8/1970 | Reuter et al. . | |
| 3,724,789 | 4/1973 | Snyder . | |
| 3,749,337 | 7/1973 | Jalbert . | |
| 3,893,641 | 7/1975 | Sutton . | |
| 4,634,080 | 1/1987 | McNally . | |
| 4,684,082 | 8/1987 | Gargano | 244/142 |

FOREIGN PATENT DOCUMENTS

| 3707463 | 10/1987 | Fed. Rep. of Germany | 244/145 |
|---|---|---|---|
| 2502579 | 10/1982 | France | 244/145 |

*Primary Examiner*—Galen Barefoot
*Assistant Examiner*—Rodney Corl
*Attorney, Agent, or Firm*—William W. Haefliger

[57] ABSTRACT

A parafoil includes upper and lower panels, connector panels, load strands, and tapes attached to the connector panels to form cusps, and catenaries between the cusps.

11 Claims, 2 Drawing Sheets

LOAD DISTRIBUTING CURVED TAPES ON PARAFOIL PANELS

BACKGROUND OF THE INVENTION

This invention relates generally to parafoils, and more particularly to improvements in parafoil construction enabling attainment of significantly higher glide ratios.

The upper surface of a parafoil is the most important as respects attainment of lift; and the smoother that surface, in a forward to rearward direction, the higher will be the efficiency of its lift creating effectiveness. In the past, this upper surface tended to have "dimples", i.e. downward recesses, caused by uneven load transmission to that surface from local points of load bearing line connections to the under surface of the parafoil. Such dimpling prevents the required top panel smoothness, and reduces efficiency to an extent that glide ratios are reduced, substantially.

The lines were typically connected to lower edges of vertical panels or fabric ribs, and the load was then locally transmitted via the ribs, or panels to local areas of the top panel, producing downward dimpling. In U.S. Pat. No. 3,724,789 to Snyder, triangular tape patterns were employed; however, the load was transmitted lengthwise of the straight tape to a local point or area of the top panel, which again produces undesirable dimpling. There is need for a parafoil construction eliminating this problem.

SUMMARY OF THE INVENTION

It is a major object of the invention to provide an improved parafoil structure that meets the above need, and that avoids the problems associated with prior parafoil devices.

It is a further object of the invention to provide an improved parafoil wherein loading locally imposed by load lines is distributed to the top fabric panel so as to avoid dimpling in a forward to rearward direction, whereby top panel lift creating smoothness is not disturbed, and whereby concentrated suspension line loads are evenly and continuously distributed into the parafoil structure, thereby increasing the strength of the parafoil and its ability to bear high loads without local structural failure.

It is another object to provide a parafoil characterized by an unusually high glide ratio.

It is yet another object to provide a simple, effective tape means in a parafoil for achieving a high degree of load distribution in upright connector panel means that interconnects upper and lower fabric panels.

The above objects are realized through provision of load-bearing tapes attached to the connector panels to extend along curved lines which are upwardly convex between the upper and lower fabric panels, the lines having lowermost terminations proximate forward and rearward locations receiving loading from load support lines. Typically, the tapes are convex in such a way as to distribute the loading to the upright panels along their lengths in such a way that the connections of those panels to the top lift creating panels are smoothly curved, with upward convexity between upper panel forward and rearward edges, during parafoil flight, with pockets formed by the panels fully inflated. As will be seen, the curvature of the tapes is desirably of catenary, or near catenary configuration.

These and other objects and advantages of the invention, as well as the details of an illustrative embodiment, will be more fully understood from the following specification and drawings, in which:

DRAWING DESCRIPTION

DETAILED DESCRIPTION

Figure 1:
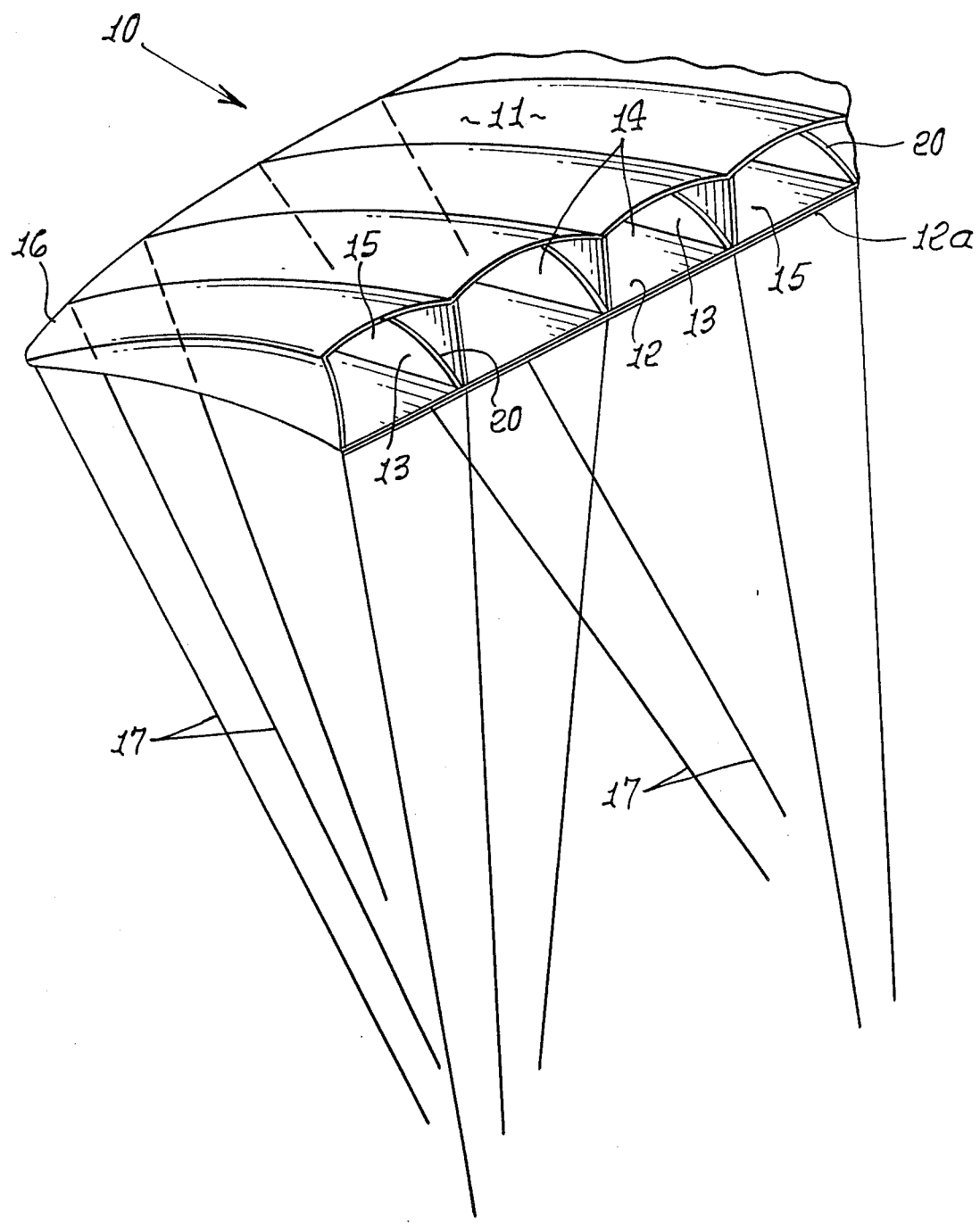
FIG. 1 is a perspective view of a parafoil in flight.
Figure 2:
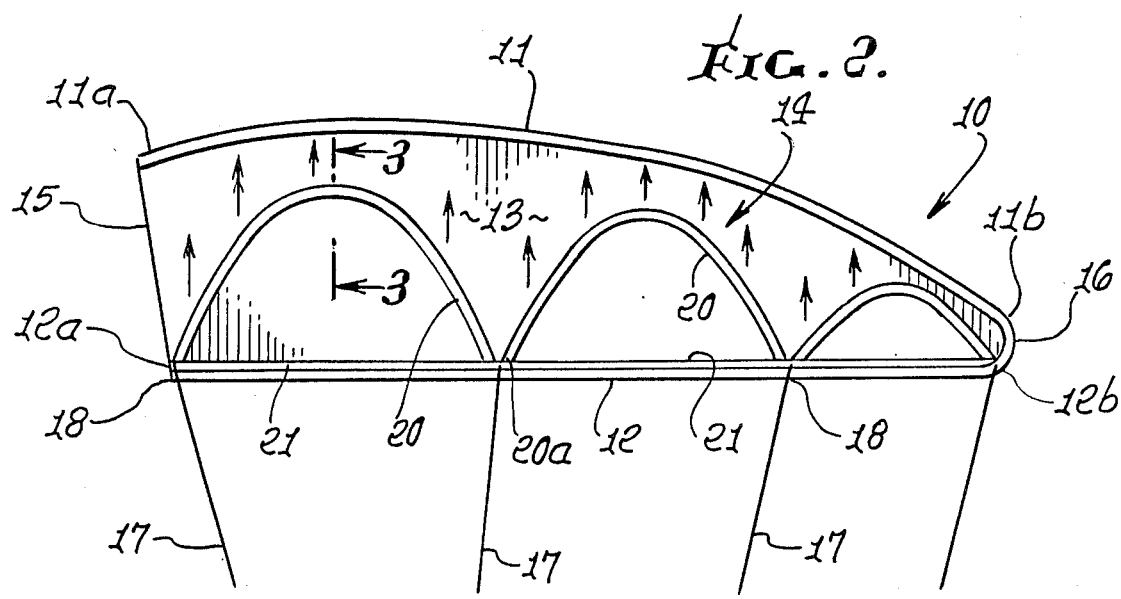
Fig. 2 is an enlarged elevation showing a parafoil upright connector panel construction with load distributing tape means attached to the upright panel.

The parafoil 10 shown in FIGS. 1 and 2 includes an upper fabric panel 11, a lower fabric panel 12 spaced below the upper panel, and upright connector panels 13 joined to panels 11 and 12 and laterally spaced apart. The panels 13 extend generally forwardly and rearwardly, and form with panels 11 and 12 air inflated pockets 14 having open forward ends 15 and closed rearward ends 16. The upper panel is humped upwardly at location 11a, between the upper edges of the panels 13; however, in accordance with the invention, the upper panel 11 is smoothly accurate, and upwardly convex, in forward and rearward directions —i.e. there are no dimples (downward recesses) in the upper panel, spaced apart in forward to rearward directions. In this regard, load support strands or lines 17 are connected to the parafoil at forward and rearwardly spaced locations 18, proximate lower edges of the connector panels. See FIG. 2. The panels 11, 12, and 13 may consists of Nylon fabric, or other strong lightweight fabric, that is easily foldable. The upper and lower panels define parafoil forward edges 11a and 12a, and rearward edge or edges at 11b and 12b. See FIG. 2.

In accordance with an important aspect of the invention, load distributing tapes are attached to the connector panels to extend along curved paths or lines which are upwardly convex between the upper and lower panels 11 and 12; the lines or paths having lower terminations proximate the forwardly and rearwardly spaced locations 18. Typically, the tapes are everywhere spaced below the upper panel, i.e. do not extend upwardly into contact with the upper panel.

As shown, and most preferably, the tapes indicated at 20, have upward or catenary inverted configuration between their lower terminations 20a which form junctions with the upper ends of the lines 17 and 18. Also, there typically are reinforcing seams 21 that extend along the lower edges of the upright panels 13, and the lower terminals 20a of the tapes are typically attached to those seams; whereby the locations 18 are highly reinforced as comprising junctions of elements 17, 20 and 21. Tapes 20 may form cusps, as shown, at junction 18, and the cusps may extend below seams 21.

Figure 3:
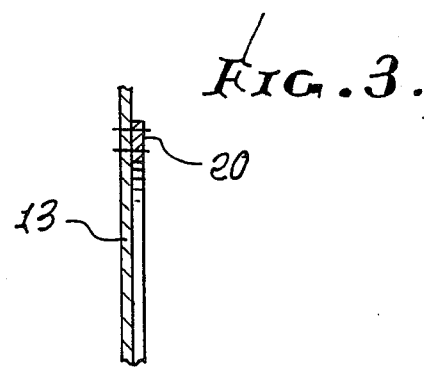
Fig. 3 is an enlarged section taken on lines 3—3 of FIG. 2.

The tapes 20 provide means configured to generally evenly distribute vertical loading, exerted on junctions 18 by stands 17, to and along the upright panel extents above the tapes, so that such loading is evenly distributed along the connections of the panels 13 to the top panel 11, whereby such linear connections are smoothly curved with shallow upward convexity between the forward and rearward edges of the parafoil. Multiple such catenaries are provided, as is indicated in FIG. 2. The flexible, foldable tapes 20 are stitched to the sides of the panels 13, as indicated in FIG. 3, and they may consist of webbing, woventape or braided line and have thickness greater than that the fabric thickness of panels 13. The tape has tensile stiffness significantly greater than the tensile stiffness of the panel fabric.

Figure 4:
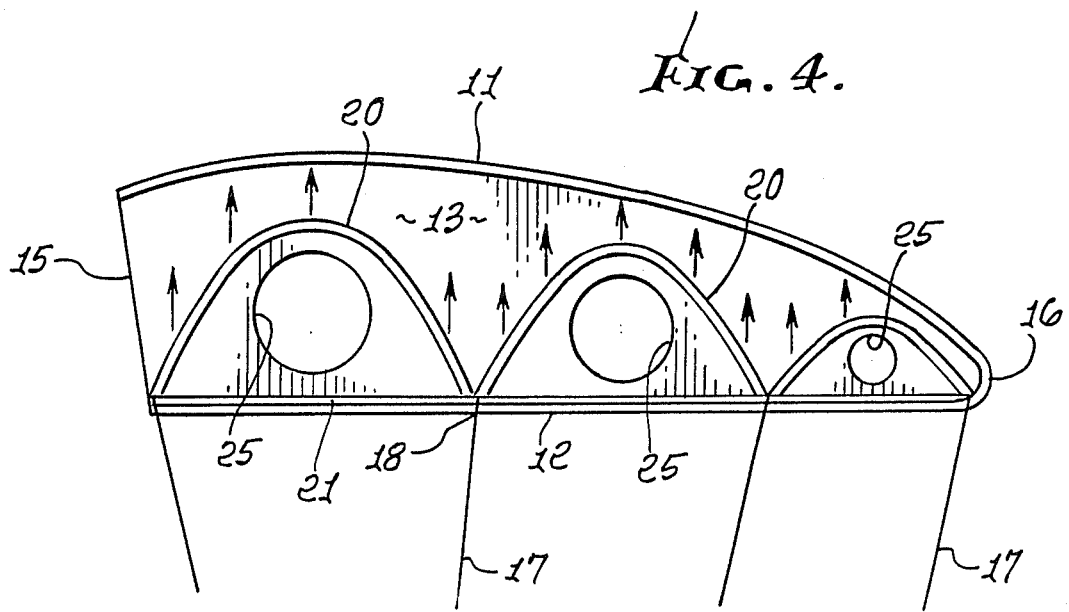
FIG. 4 is a view like FIG. 2, showing a modification.

FIG. 4 shows side vent circular openings 25 through a connector panel 13, the openings located below the tapes 20 so as not to disturb the even distribution of loading transmitted from the tapes via panel 13 upper extents above the tapes, to the upper panel 11. See load indicating arrows 26.

In summary, the invention provides an improved parafoil structure wherein loading is distributed smoothly and continuously along the length of each rib panel 13, and results in a stronger parafoil with a smoother upper surface, better aerodynamic efficiency, and better glide performance.

Loading is exerted for example by a body attached to lower ends of strands 17.

I claim:

1. In a parafoil, the combination comprising
   (a) an upper panel,
   (b) a lower panel, spaced below said upper panel,
   (c) upright connector panels joined to said upper and lower panels and laterally spaced apart, the connector panels extending generally forwardly and rearwardly and forming inflatable pockets having open forward ends and closed rearward ends, the pockets laterally spaced apart,
   (d) load support strands connected to the parafoil at forwardly and rearwardly spaced locations proximate lower edges of the connector panels,
   (e) and load distributing tapes attached to said connector panels to extend along curved lines which are upwardly convex between said upper and lower panels, said tapes having lowermost terminations proximate said forwardly and rearwardly spaced locations,
   (f) said panels consisting of lightweight easily foldable fabric materials, and said upper and lower panels defining forward and rearward edges of the parafoil.

2. The combination of claim 1 wherein said load distributing tapes are everywhere spaced below said upper panel.

3. The combination of claim 1 wherein said tapes have catenary configuration between said lowermost terminations thereof.

4. The combination of claim 1 wherein there are seams that extend along lower edges of said upright panels, the lowermost terminations of the tapes attached to said seams, and the strands also attached to the seams.

5. The combination of claim 1 wherein said tapes provide means configured to distribute loading to and along said upright panels so that the connections of the upright panels to the upper panel are smoothly curved with upward convexity between said forward and rearward edges of the parafoil, during parafoil flight with said pockets airinflated.

6. The combination of claim 5 wherein said tapes form multiple catenaries along the forward to rearward lengths of each connector panel.

7. The combination of claim 3 wherein said tapes form multiple catenaries along the forward to rearward lengths of each connector panel, and said parafoil has a consequent increased glide ratio and increased strength.

8. The combination of claim 1 including cross vent openings through certain connector panels, said cross vent openings located below said load distributing tapes.

9. The combination of claim 3 including cross vent openings through the connector panels, each cross vent opening located below one of the catenary configured tapes.

10. The combination of claim 6 wherein the tape has tensile stiffness significantly greater than the tensile stiffness of the panel fabric.

11. The combination of claim 1 wherein the tapes form cusps below lower edges of the connector panels.

* * * * *